Nov. 29, 1966 W. J. MIDDLETON, JR 3,288,607

MASTER DRAWINGS AND METHOD OF MAKING
TRANSPARENCIES FROM SAME

Filed Aug. 16, 1962 4 Sheets-Sheet 1

INVENTOR
WILLIAM J. MIDDLETON, JR.

BY: Julian C. Renfro
Michael A. Sileo, Jr.
ATTORNEYS

INVENTOR
WILLIAM J. MIDDLETON, JR.
BY: Julian C. Renfro
Michael A. Sileo Jr.
ATTORNEYS INVENTOR
WILLIAM J. MIDDLETON, JR.
BY: Julian C. Renfro
Michael A. Sileo, Jr.
ATTORNEYS Nov. 29, 1966 W. J. MIDDLETON, JR 3,288,607

MASTER DRAWINGS AND METHOD OF MAKING TRANSPARENCIES FROM SAME

Filed Aug. 16, 1962 4 Sheets-Sheet 4

INVENTOR
WILLIAM J. MIDDLETON, JR.

BY: Julian C. Renfro
Michael A. Sileo, Jr.
ATTORNEYS 3,288,607

MASTER DRAWINGS AND METHOD OF MAKING TRANSPARENCIES FROM SAME

William J. Middleton, Jr., Orange County, Fla., assignor to Martin-Marietta Corporation, Middle River, Baltimore County, Md., a corporation of Maryland Filed Aug. 16, 1962, Ser. No. 217,450
13 Claims. (Cl. 96—27)

This invention relates to novel master drawings of the type used in the preparation of photographic negatives employed in the fabrication of microminiature metal masks or stencils, as well as to the novel method of making master drawings and photograph negatives such as may be used in printed circuitry. More particularly, the present concept teaches a greatly improved master drawing technique which enables a master drawing to be prepared, employing various components displayed thereon by respective pre-established patterns so that by optical procedures, a given master drawing may be used for preparing a plurality of photographic negatives used for fabricating microminiature substrates, thus circumventing a usual ordeal requiring the preparation of a number of master drawings and subsequently having to bring about registration thereof.

Heretofore, it has been common to fabricate multilayer thin film substrates by using microminiature metal masks or stencils. These masks or stencils are used to control and describe the deposition of conductive and resistive materials on the thin film substrate. The preparation of the master drawings used in the development of the metal masks or stencils are arduous, tedious, and expensive tasks, for each generic or similar type component in a composite configuration must be delineated on separate master drawings.

By way of example, in the case of electronic circuit configurations, at least three or four master drawings have in the past been required to define the conductors of a relatively simple circuit while still more master drawings are necessary in the case of a more complicated circuit. Since microminiaturization of electronic circuit configurations is both desired and necessary in present day circuit package requirements, more economical, simpler, and more accurate methods for manufacturing microminiature electronic circuits has been a constant objective of those skilled in the art of microminiaturization. However, serious inherent difficulties are encountered in the fabrication of microminiature thin film substrates by present known methods. The most troublesome of these difficulties is the slight shifting during substrate fabrication of the deposited materials from their true position on the thin film substrate. This frequency results in undesirable opening or shorting of circuit conductors and out of tolerance values of circuit components. Therefore, extreme accuracy must be maintained during the deposition step in the fabrication of thin film substrates.

In order to maintain the required high degree of material deposition accuracy, close tolerance registration of the microminiature metal masks or stencils during deposition has been mandatory. There are several known methods of obtaining acceptable close tolerance registration of the masks. For purposes of this invention a detailed description of such methods is not deemed necessary. However it is to be understood that any well known method of providing close tolerance registration may be used in the practice of this invention.

It is common knowledge among skilled artisans in the thin film substrate art to fabricate metal masks or stencils by using photographically reduced film negative techniques together with well known chemical etching processes much in the same manner as is used in the fabrication of printed circuits. The high degree of accuracy required during the chemical etching step is directly proportional to the accuracy of the master drawing from which the reduced photographic negative is made. This is so since photographic reduction can be accurately controlled by present known techniques. Thus, the accuracy of the metal mask, which is made from the photographically reduced negative, directly depends upon the accurate fabrication of the master drawings.

In prior known master drawing fabrication techniques, a series of several master drawings are used and each master drawing in the series must be accurately aligned with the other master drawings during the photographic reduction step. It is common practice, therefore, to use identically positioned registration marks on each master drawing of the series for alignment purposes. However, any inaccuracy of registration mark locations introduced into the master drawing complicates greatly the task of subsequently aligning the negatives during the fabrication of the metal masks.

Although the prior art methods of metal mask fabrication can produce a reasonable accurate registration, the excessive number of required master drawings necessary to achieve satisfactory results are time consuming, tedious and costly.

In view of the foregoing problems, an organized research program was undertaken to solve these problems and in so doing it was discovered that the fabrication of the master drawings for a six mask multilayer thin film substrate in accordance with previously known methods required approximately 240 man-hours of drafting and checking time.

In addition, the photographic processing for delineation and the chemical processing for metal deposition of this average size multilayer thin film substrate required approximately 20 additional man-hours in handling and setup.

In accordance with the present invention the foregoing inherent and obvious high cost and excessive time disadvantages of the prior known methods of fabricating multilayer thin film substrates are uniquely overcome by employing novel photographic color separation techniques which permit the representation of two or more different type components on a single master drawing. This technique advantageously reduces labor costs to at least one half the labor costs of previously known processes.

More specifically, the novel master drawings of the present invention comprises the use of a base material and means for representing a configuration by use of colored geometric patterns on films or tapes, which film or tape patterns represent certain components and elements of the desired configuration. This latter means, by way of example, may comprise transparent, translucent or opaque films of at least two different colors, with film of a first of these colors being employed on the base material to represent one aspect of the configuration and film of other colors representing other aspects of the configuration. At least one of said films has a substantially regular geometric pattern of color areas thereon, and the several films are mounted upon the base material so as to have their respective colors relatively disposed in a predetermined arrangement on the base material so that when the films are disposed, in certain areas, with a portion of one color film upon a portion of different colored films, all colors are photographically distinguishable at locations of overlap. As will be more apparent hereinbelow, when the master drawings are photographed through successive selective color filters, employing either transmitted light or reflected light, first one aspect of the configuration of a first color can be photographed and subsequently other aspects of the configuration of other colors can be photographed, with no substantial color loss of the configuration in either color being sustained in areas of overlap.

Advantageously, these novel master drawings may be subsequently used for photographically preparing negatives for use in fabricating multilayer thin film substrates for microminiaturization of component assemblies such as electronic circuits. In the case of electronic circuits, the master drawing comprises a base material, and includes means for creating a circuit pattern on the base material representative of the components of an electrical circuit including conductors, resistors, and dielectrics. This latter means comprises transparent films having thereon, in one example, translucent substantially regular patterns of at least two colors. Films of one of the colors are employed on this base material to represent one type of electrical component and films of another color are employed to represent a second type of electrical component. Such films have geometrical patterns of color areas formed thereon and are mounted upon said base material so as to have their respective colors disposed in an arrangement so that when the films are disposed one upon the other both colors can be optically or photographically observed at locations of overlap. Thus, when the master drawing is subsequently photographed through successive color filters, first one circuit subsection of a first color can be photographed and subsequently other subsections of a second color can be photographed, with no substantial color loss of the circuit image of either color being sustained in areas of overlap or crossover.

It should be noted at this time, that when transmitted light is used for photographing, the colored patterns should be translucent whereas the base material and film may be either transparent or translucent. On the other hand, when reflected light is used for photographing, both the base material and colored patterns should be either translucent or opaque whereas the films should be transparent or translucent. However, it should be understood that the layers of film which are overlapped by other layers of film may be opaque but the overlapping layer of film in this latter arrangement must be translucent or transparent.

As mentioned above, color separation offers an acceptable method of combining two or more masters on a single drawing. That is to say, multilayers of film having geometric color patterns formed thereon may be used on a single base for fabricating a single master drawing. The unique technique of color separation of the present invention is predicated upon the following:

(1) Pure colors in an intermingled area are easily separated by use of photographic filtering techniques provided the colors are not blended due to overlap.

(2) When a close pattern of dots, lines or other geometric figures are photographed through a low resolution reduction lens, and a low resolution film is used, the patterns run together or merge to form a solid image on the photographic emulsion of the film. This phenomenon is also observed when the same pattern is photographically reduced.

(3) Photographs of colored subjects, such as green and red, when recorded on black and white film, appear in tones of black and white. If the tonal quality of the colors is identical or similar in intensity in a composite color or multicolored subject, one color will be recorded on the black and white film at the same tonal intensity of black and white or gray as the other.

In order to utilize the intrinsic derivatives of the above three facts and to apply them to the manufacture of master drawings, a system of colored geometric patterns on film has been evaluated, and it has been discovered that certain configurations of colored film patterns are adequate for the photographic reduction process further described in this disclosure.

More specifically, whenever film layer overlap or crossover occurs in the fabrication of the multilayer master drawing, the geometric figures of the overlapping films must be so arranged so that they intermingle rather than overlap each other. By way of example, if color dot patterns only are used and overlap occurs in the master drawing, the dots of the patterns at the area of overlap must not lie one over the other but must intermingle or be relatively positioned so that each color dot will pass or reflect light toward the color filter and lens used. That is to say, if adjacent dots of the patterns were overlapped, the colors would be blended into a third color and separation by so called split filtration techniques would be necessary. It is to be understood, of course, that when more than two geometric color film patterns are used, split filtration techniques must be used in order to separate the several colors which are blended. Though split filtration is not a specific part of this application, it is clearly a necessary step of the process when plural colored geometric patterns are used to fabricate the master drawing.

In addition, when color dot patterns are used in combination with solid color patterns and overlap occurs in the fabrication of the master drawing, the dot patterns must overlap the solid patterns so that each color dot will pass or reflect light toward the color filter and lens used.

It is to be understood that other colored geometric patterns may be used in combination with the same or different colored geometric patterns but when overlap occurs in the fabrication of the master drawing the geometric color figures on the film must not overlap so as to cause color blending. On the contrary, the figures on the film at the area of overlap must be relatively positioned so that each colored figure will pass or reflect light toward the color filter and lens used. In this connection, if more than two different colored film patterns are used and color blending ensues, the expediency of split filtration must be incorporated as an intermediate step in the method of photographically fabricating the microminiature negatives.

Although the dot pattern is the basic key to this unique technique of combining two or more masters on a single drawing, spaced line patterns and solid colors have been successfully used in this process to give greater flexibility and added contrast for photographic purposes.

It is accordingly a primary object of the present invention to provide novel master drawings having plural color geometrically patterned film strips representing the components of a desired configuration.

It is a further object of the present invention to provide a novel method for fabricating a plurality of microminiature negatives which method includes the use of a novel master drawing wherein geometrically patterned films of one color are used to represent one type of component of a desired configuration and geometrically patterned films of another color are used to represent another type of component.

It is a further object of the present invention to provide a novel method for producing a plurality of photographic negatives which method includes the preparation of a novel master drawing comprising dot patterned films of one color for representing one type of electronic circuit component and dot patterned films of another color for representing another type of electronic circuit component and further includes successive photographing of the master drawing utilizing color filters for photographically separating one circuit component from the other.

It is a further object of this invention to provide a novel method for manufacturing a plurality of photographic negatives from a single master drawing wherein multilayer films of colored dot patterns are used to represent the components of a configuration and which the overlapped areas of the films are uniquely compensated for by relatively positioning the colored dots on the films at the area of overlap and by the use of color filtration and successive photographing.

It is a further object of this invention to provide a novel master drawing and a novel method of photographically preparing microminiature photographic negatives which materially reduce the number of master drawings required for the preparation of multilayer thin film electronic circuits.

It is a further object of this invention to provide a novel master drawing for photographically preparing microminiaturized negatives on which circuit components, which have heretofore been shown on two or more master drawings, may be combined on a single master drawing, thereby decreasing the man hours required to prepare such master drawings and increase the accuracy of registration and material deposition of circuit components on the microminiaturized thin film electronic circuits made through the use of the negatives.

It is a further object to provide a novel master drawing by employing different colored translucent or opaque dot patterns on transparent tapes laid out according to desired configurations, on a transparent backing or base drawing material, having overlapping areas comprised of intermingled dot patterns rather than overlapped or blended patterns.

According to the basic concept of the invention, a master drawing to be used for optically preparing transparencies is prepared which comprises a base material and means for representing at least two different configurations upon the base material. This latter means includes means for representing at least one of the configurations optically different from the remainder of the configurations, and capable of being optically distinguished even at locations of overlap of the configuration.

One detailed example of the present invention employs a master drawing prepared by using translucent or opaque colored geometric patterns printed on a transparent film backed with a transparent adhesive and adhered to a base drawing material in relative positions which define the configurations to be microminiaturized. For example, in an electronic circuit configuration the conductors may be represented by one color pattern and the resistors by another color pattern, or horizontally disposed conductors may be represented by one color pattern and vertically disposed conductors may be represented by another color pattern. In the example described below, a red colored dot pattern is employed to represent vertical conductors and a green colored dot pattern is employed to represent horizontal conductors on one master drawing, and a red colored dot pattern is employed to represent resistors and a green colored dot pattern is employed to represent the dielectric (insulator) components on another master drawing. In the photographing step, a green filter may be used to photographically prepare a negative of the vertical conductors and the resistors and, by substituting a red filter, a negative of the horizontal conductors and dielectric components can be prepared. Thus, only one master drawing is necessary to represent the circuit components for photographically preparing two negatives.

These and further objects and advantages of the invention will become more apparent upon references to the following description and claims and the appended drawings wherein:

Figure 1:
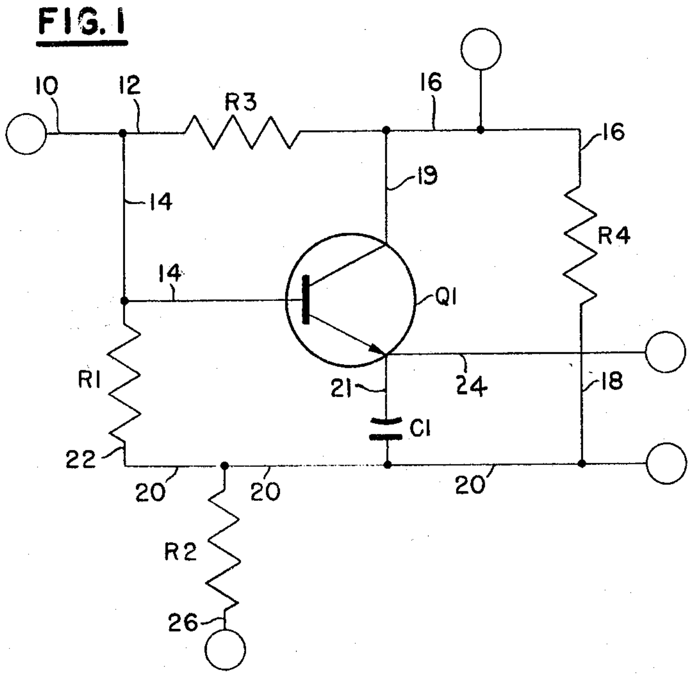
FIG. 1 shows an electronic circuit arbitrarily selected to demonstrate the technique of the invention.
Figure 2:
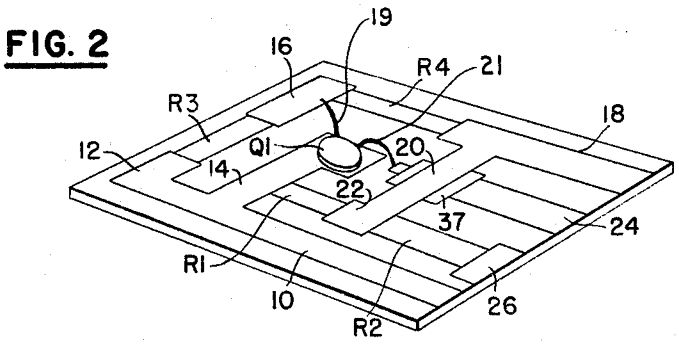
FIG. 2 shows the entire hypothetical microminiature multilayer thin film circuit according to FIG. 1.

Referring to the drawings, particularly FIGURE 1, there is illustrated an electronic circuit which has been arbitrarily selected for the purpose of explaining the technique of the present invention. This circuit includes the conductors 10, 12, 14, 16, 18–21, 22, 24 and 26, resistors R1, R2, R3 and R4, capacitor C1, an electronic device, such as a silicon transistor Q1, and suitable connectors. In FIGURE 2, the entire thin film multilayer circuit in microminiature form is shown, in which corresponding components are designated by corresponding reference characters. As indicated above, these circuit assemblies are minute in size, frequently much less than one-half of an inch on each side. It will be observed that the various conductors and other components are disposed at substantially right angles to each other so that the conductors 10, 18, 22 and 24, and resistors R1, R2 and R4 extend generally in one direction, and the conductors 12, 14, 16, 20 and 26, resistor R3, and insulator 37, extend generally in the opposite direction. Also, the transistor Q1, collector lead 19 and emitter lead 21 are centrally disposed on the substrate.

The prior art is replete with particular methods by which microminiature assemblies of the form shown in FIGURE 2 may be made. By way of example, reference is made to the published book, entitled "Microminiaturization of Electronic Assemblies," published by Hayden Book Co., Inc., New York. (Proceedings of Diamond Ordnance Fuze Laboratories—1958 Symposium on Microminiaturization) and to the articles "Step-by-Step Design Techniques for Multilayer Thin Film Networks" by W. N. Carroll and F. F. Jenny, Electronics, issue of May 19, 1961, and "Thin Film 2–D Circuits," Electronic Design, issue of November 9, 1960. The methods discolsed in the foregoing publications involve the use of photographic and chemical processes in which a metal mask is chemically etched by an acid at locations where the circuit components have been opaquely set forth on a film negative, thus creating metal patterns that can be subsequently employed for bringing about a selective deposition of conductive and resistive materials onto a substrate of ceramic, glass or the like to create a desired multilayer thin film circuit, to which the transistor is subsequently added.

Figure 3:
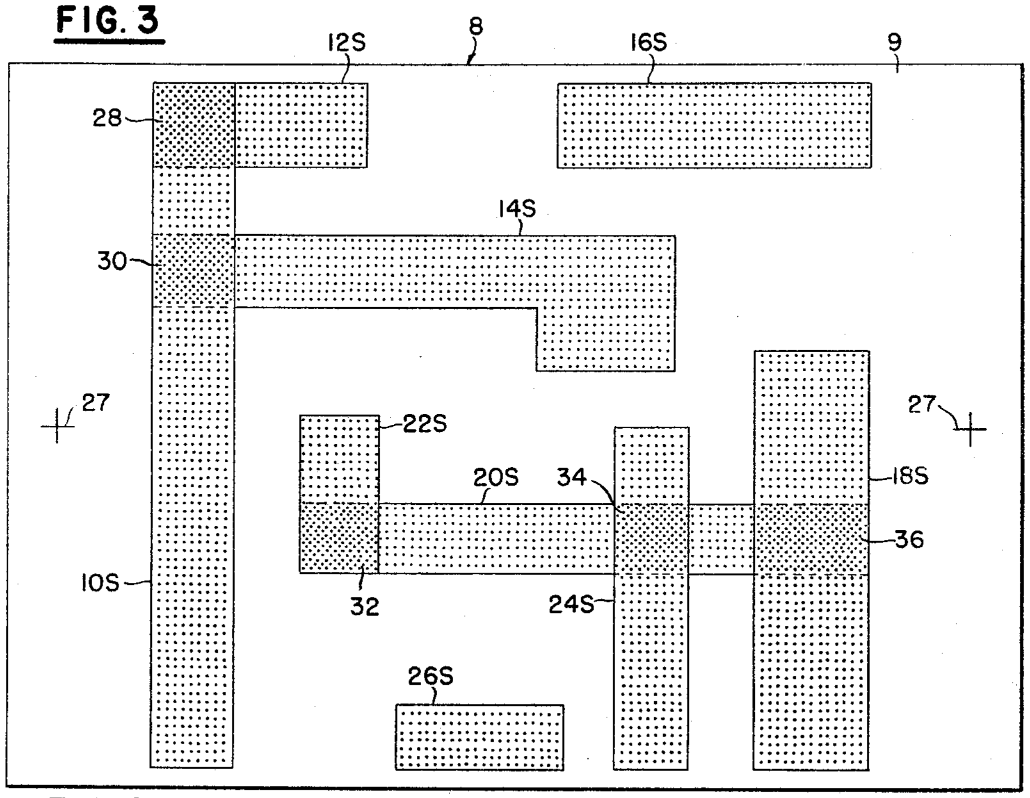
FIG. 3 shows a first master drawing of the conductor layout with vertical conductor patterns appearing in dots of one color, and horizontal conductor patterns appearing in dots of a different color.

Referring now to FIGURE 3, there is shown a master drawing 8, according to the present invention, which comprises an opaque, translucent or transparent base 9 of a suitable stable base material (such as Mylar, .004" to .006" thick) upon which the conductor and component color pattern films are mounted to produce the circuit assembly of FIGURE 2. The medium selected for the circuit pattern is a transparent film (e.g. a .001" stable based polyester) upon which is printed a series of translucent, solid colored dots. These films may be, for example, of the type commercially manufactured and sold by the Para-Tone Corporation of 512 W. Burlington Ave., La Grange, Illinois (i.e. Zip-A-Tone films) which are primarily utilized in color coding manufacturing and production drawings for item identification, or used for esthetic purposes in product display packages, wrapped gifts, decorations, etc. It has been discovered that a color dot arrangement having dots of a diameter approximately .025" is sufficiently adequate for the photographic reduction step of this invention though other dot diameters and center-to-center spacings may be used without departing from the spirit of this invention. The film used is clear adhesive backed and of the type which easily adheres to the base 9. The method of attachment is similar to that used to apply printed circuit "tape." Subsequent trimming defines the particular outline of the desired component or circuit configuration.

By way of example only, the horizontal conductor strips 12S, 14S, 16S, 20S and 26S, which correspond respectively to the conductors 12, 14, 16, 20 and 26, may employ green dots, and the vertical conductor strips 10S, 18S, 22S and 24S, which correspond respectively to the conductors 10, 18, 22 and 24, may employ red dots. The horizontal and vertical conductor strips are arranged to include overlapping areas 28, 30, 32, 34 and 36, and the green dots and red dots on the respective strips are so placed that they intermingle instead of overlap, thereby enabling dots of both colors to be plainly visible. The master drawing 8 also includes a pair of registration marks 27, which are drawn in with black ink, black tape or any other well known black material.

Figure 4:
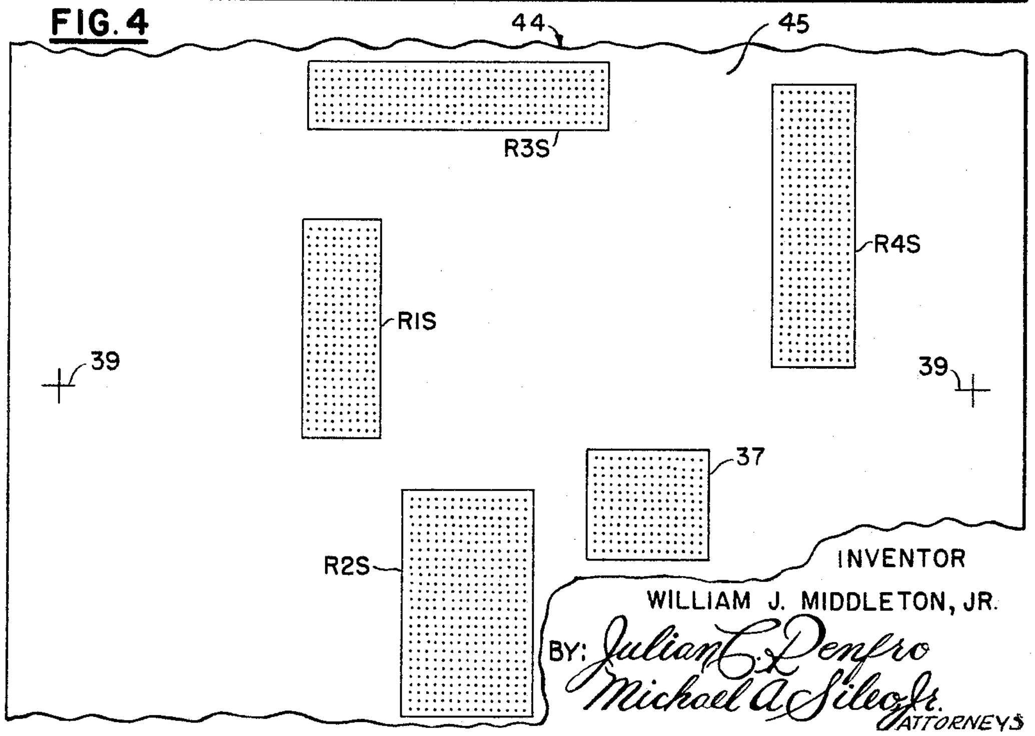
FIG. 4 shows a second master drawing with the resistor layout appearing in dots of one color, and the insulator outline appearing in dots of a different color.

Referring now to FIGURE 4, there is shown a second master drawing 44 comprising a transparent, translucent or opaque base 45 of a suitable material, on which are mounted the film strips R1S, R2S, R3S and R4S, which correspond respectively to the resistors R1, R2, R3 and R4 of FIGURES 1 and 2, and an insulator strip 37. Also included is a pair of registration marks 39 drawn in with blank ink, black tape or other well known black material. The horizontal resistor strip R3S and the vertical resistor strips R1S, R2S and R4S employ red dots whereas insulator strip 37 employs green dots. The registration marks 27 of FIG. 3 occupy relative identical positions on base 46 as the registration marks 27 occupy on base 8. The resistor and insulator strips of the master drawing 44 may utilize dots, lines, solid colors or any other geometric pattern since no overlaps occur in this particular master drawing.

Figure 5:
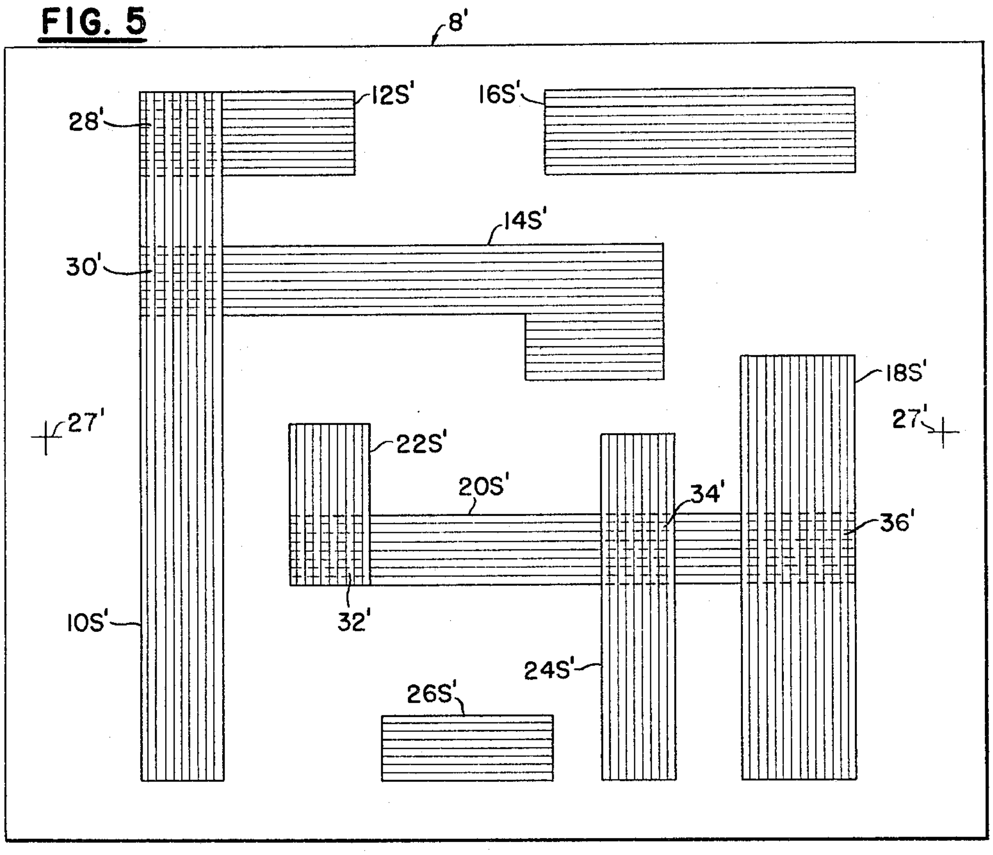
FIG. 5 shows a modified construction of the first master drawing of FIG. 3 employing different colored lines on the horizontal and vertical conductor patterns.

Referring now to FIG. 5, there is shown a modification of this invention in which a series of spaced translucent or opaque parallel fine line patterns are used in place of the dot patterns, as shown in FIGS. 3 and 4, to achieve the same result. The strips in FIG. 5 correspond, in relative position, to those in FIG. 3, and are identified by the same reference characters with the addition of the superscript "prime." The horizontal conductor strips 12S′, 14S′, 16S′, 20S′ and 26S′ include green lines extending generally parallel with the long edges, and the vertical conductor strips 10S′, 18S′, 22S′, and 24S′ include similar red lines. The overlapping areas are designated at 28′, 30′, 32′, 34′ and 36′, and the back-ink registration marks are designated 27′. It should be noted that when line patterns are employed and transmitted light is used in the photographic reduction process all lines should run parallel rather than perpendicular to each other. However, if reflected light is employed parallelism or perpendicularity is of no significant importance. It should also be understood that the lines may extend in directions other than parallel with the long edges, that the lines need not be straight, nor parallel, so long as the pattern of lines, when photographically reduced through a low resolution lens and recorded on a low resolution film, form a solid image on the photographic emulsion of the film.

Figure 6:
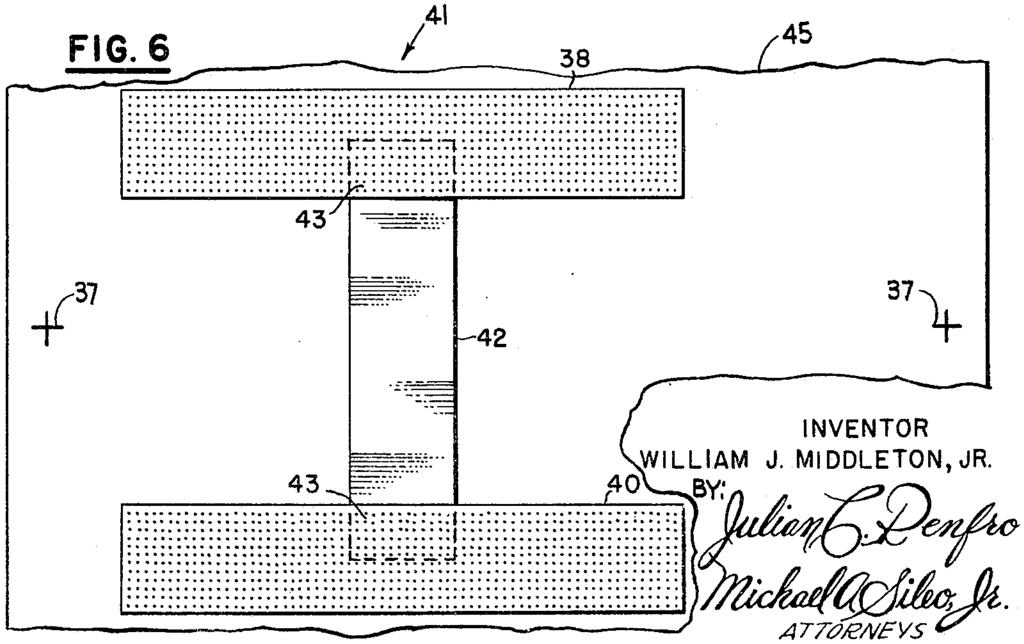
FIG. 6 shows a modified form for the layout of conductors employing colored dots for the horizontal conductor patterns and a solid color for the vertical conductor pattern.

Referring now to FIG. 6, there is shown another modification of the present invention, in which the master drawing 41 comprises a base 45 which employs both strips of opaque solid color film and strips of film having an opaque colored dot pattern. The horizontal conductor strips 38 and 40 use green dots, while the vertical conductor strip 42 is solid red. In the overlapping areas 43, the dotted strips 38 and 40 overlie the solid colored strip 42. The registration marks 37 are drawn in a similar manner to that above set forth with regard to registration marks 27 and 39 of FIGURES 3 and 4, respectively.

Referring again to FIGURE 6, the strips 38 and 40 may be opaque, solid color film of one color and strip 42 may be an opaque solid color film of another color. Also, the overlap areas 43 may be made solid black by drawing them in with black ink, black tape or other suitable black material.

It should be noted at this point that reflected light photography must be employed when opaque solid color films are used, but either reflected or transmitted light photography may be used when patterns of translucent colored dots or colored lines or other colored geometric patterns are used on transparent backing or base drawing material. Also, when two or more solid color patterns are used and the overlapped areas appear black to the camera and film, there is no need to draw in the overlap areas in black. That is to say, when two complementary colors, such as red and green, overlap the area of overlap will appear black to the camera and film.

As pointed out above, the size and spacing of the dots or lines on the master drawing are such that, when a low resolution reduction lens and a low resolution film are used, the colored dots or lines merge to form a solid image on the film emulsion. Panchromatic litho black and white film may be employed, and each color is separately recorded on a separate photographic film or plate together with the registration marks. The photographic negatives thus obtained can be used to make film positives if they are required in the metal mask etching process. While black and white panchromatic lithofilm is preferred, it is evident that the various components of the master drawing could be recorded on other well known optically or photographically sensitive materials such as light sensitive film.

A reduction ratio of 20:1 is preferable to effect the merging of the dot or line patterns in accordance with this invention, but the degree of reduction can be varied according to the resolution of the film and lens set-up being used without departing from the spirit and scope of the invention. This is an important consideration in determining the size of the master drawings, since the master drawing size is directly dependent upon the ultimate size of the circuit and the degree of reduction required to effect a merger of the dot or line patterns on the photographically prepared film negative.

Figure 7:
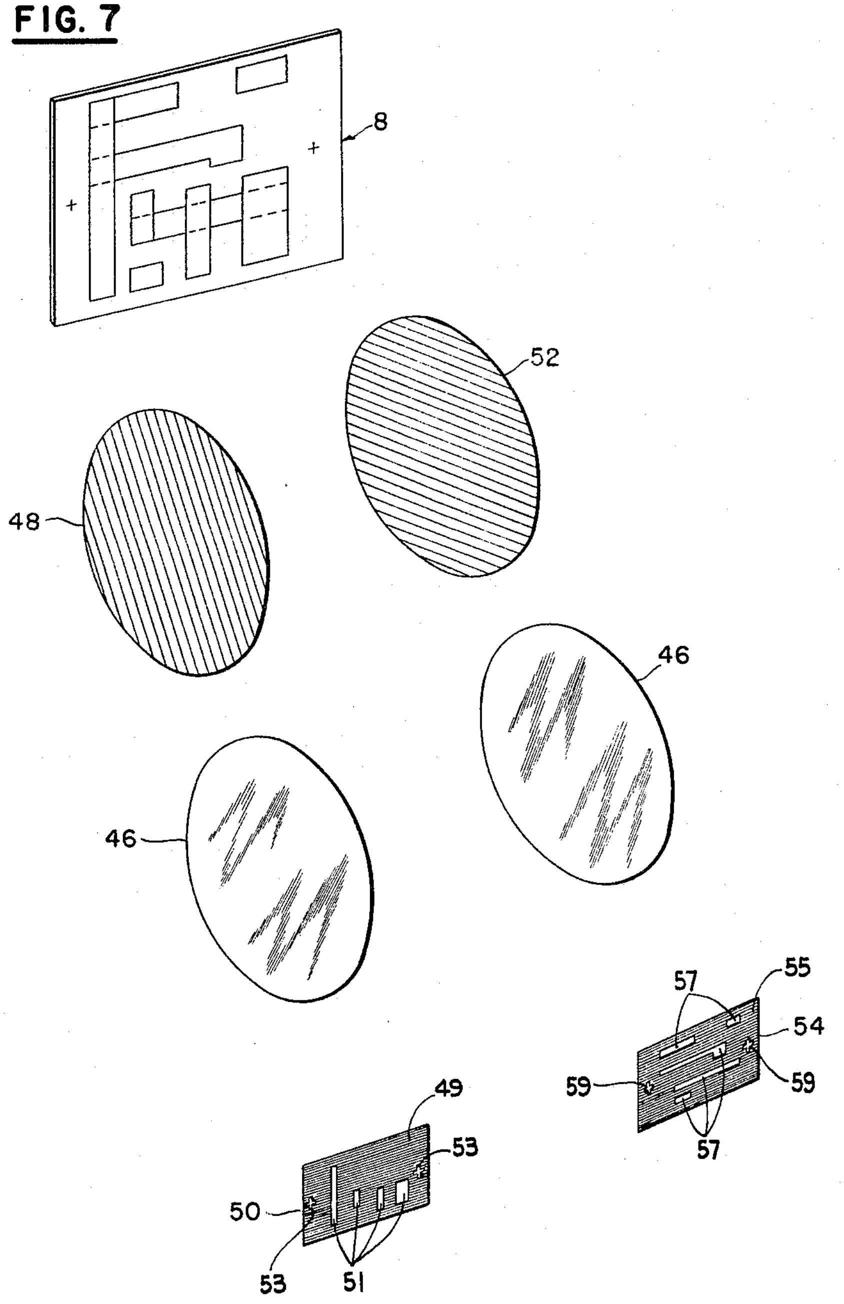
FIG. 7 shows schematically the manner in which separate negatives bearing different circuit components are photographically prepared from a single master drawing according to the present invention.

The method by which at least two transparencies, such as photographic negatives, may be prepared from a single master drawing in accordance with the present invention is schematically shown in FIG. 7 wherein the master drawing 8 may include either the color dot pattern arrangement of FIG. 3, the color line pattern arrangement of FIG. 5 or any combination of dots, lines, solid colors or other geometrically colored patterns within the spirit and scope of this invention.

For purposes of describing the novel method of the invention, the photographic step includes the use of conventional film for preparing photographic negatives. It is to be understood, of course, that other well known optically or photographically sensitive materials may be readily substituted without departing from the spirit and scope of this invention.

In preparing the first photographic negative 50, a solid green filter 48 is first used to pass only green light waves and to block substantially all red light waves from passing through the lens 46 and impinging on the negative 50.

It is to be noted at this point, that green light waves emanate in substantial quantities from the green color patterns of master drawing 8 but substantially no green light waves emanate from the red color patterns of master drawing 8. Thus, the black area 49 of negative 50 represents the exposed portion and the white slotted areas 51 and white crosses 53 of negative 50 represent the unexposed areas. The element 46 represents the camera lens.

In developing the second photographic negative 54, a solid red filter 52 is substituted for the green filter 48 and used to pass only red light waves and to block substantially all green light waves from passing through the lens 46 and impinging upon negative 54. As mentioned above with regard to the development of negative 50, the dark area 55 of negative 54 represents exposed portions and the white slotted areas 57 and white crosses 59 of negative 54 represent unexposed areas.

In view of the foregoing, it will be apparent to skilled artisans that merely one master drawing fabricated in accordance with the present invention is needed for photographically preparing a plurality of transparencies. It is to be understood, of course, that film strips of more than two colors may be used in the fabrication of the novel master drawing of this invention, but when this is done the technique of split filtration must be incorporated in the photographic step of the present invention.

The following examples of specific elements and parameters have been used to successfully achieve the objectives of this invention. These elements and parameters are as follows:

(1) The films, for transmitted light or for reflected light, should be transparent; the use of transparent Mylar, .001" thick being preferred;

(2) Dotted line or other geometric patterns, for transmitted light, should be translucent; for reflected light, such patterns may be either translucent or opaque;

(3) The colors employed may be any combination of red, green and blue;

(4) The base material, for transmitted light, must be transparent or translucent, .004"–.006" thick Mylar being satisfactory; for reflected light, transparent or translucent material may be used, but must be backed with white material; an opaque white base material is preferable;

(5) The filters may be any combination of red, green and blue, depending upon the color or colors employed on the master drawing.

The following significant advantages can be realized from the practice of the present invention:

(1) More than one type of component can be described on a single master drawing.

(2) Overlap of components and conductors can be described on the same master drawing.

(3) Registration accuracy between the art work masters can be increased by at least a factor of 2.

(4) Drawing time for a thin film circuit can be reduced by a factor of at least 2.

(5) The expenditure of expensive stable based drawing material can be reduced by at least 50%.

(6) Camera set-up time for photographing can be cut to at least one half.

(7) Checking time of art work master drawings can be reduced by at least 25%.

(8) Total processing time from circuit concept to mask fabrication can be reduced by at least 45%.

From the foregoing it will be apparent that the present invention uniquely provides a method for photographically preparing a plurality of microminiature transparencies utilizing a novel master drawing wherein multilayer of films of colored geometric patterns are used to respectively delineate similar types of components of a desired configuration. Further, this invention uniquely compensates for overlapped areas of film on the master drawing by relatively positioning the geometric figures at the areas of overlap. In addition, the novel master drawing and the unique method of fabricating photographic negatives therefrom is simple in construction, economical to manufacture and highly reliable in performing the intended objects and functions.

While several embodiments of the present invention has been described in detail, it is to be understood that other modifications are contemplated which would be apparent to persons skilled in the art without departing from the spirit of the invention or the scope of the appended claims.

I claim:

1. A master drawing to be used for optically preparing transparencies comprising, in combination:
(a) a transparent base material; and
(b) a plurality of tapes disposed on said base material so as to represent a desired configuration, with each tape having geometric patterns of color formed thereon;
(c) said geometric patterns of color on at least two of said tapes having optically distinguishable characteristics, with each optical characteristics delineating at least one separately useable aspect of said configuration; and
(d) said two tapes being disposed on said base material in at least partially overlapping relationship with each other, with said geometric patterns of color of said tapes being relatively positioned at said areas of overlap so as to enable said optical characteristics of each of said aspects of said configuration to be photographically distinguishable from each other.

2. A master drawing for photographically developing reduced photographic negatives for use in the fabrication of multilayer thin film circuits for microminiaturization of electronic assemblies comprising, in combination:
(a) transparent base material; and
(b) means for representing a circuit pattern on said base material representative of the components of said electronic assembly;
(c) said means comprising a plurality of transparent films each having geometrically spaced patterns of color formed thereon;
(d) films of a first color being employed on said base material to represent one type of said components of said electronic assembly, and the remaining films of other colors respectively representing other components of said electronic assembly; and
(e) said films being mounted upon said base material so as to have their respective colors disposed in an arrangement thereon so that upon areas of said films being disposed one upon the other, said patterns of color on said films can be photographically observed at said areas of overlap, whereby upon said master drawing being photographed through successive filters, first said one component represented by said first color can be photographed, and successively said other components respectively represented by said other colors can be photographed, with no substantial loss of any of said colors being sustained at said areas of overlap.

3. A master drawing in accordance with claim 2 wherein said geometric figures are translucent.

4. A master drawing in accordance with claim 2 wherein said geometric figures are opaque.

5. A master drawing in accordance with claim 2 wherein said geometric figures are substantially circular in shape.

6. A master drawing in accordance with claim 2 wherein said patterns of color formed on said films comprise a plurality of spaced substantially parallel lines.

7. A master drawing in accordance with claim 2 wherein said films comprise a plurality of elongated strips extending in different directions, with the strips which extend in one direction comprising a plurality of spaced substantially circular figures of said first color, and the remaining strips which extend in other directions respectively comprising a substantially solid layer of said other colors.

8. A master drawing for photographically developing reduced photographic negatives for use in the fabrication of multilayer thin film circuits for microminiaturization of electronic assemblies comprising, in combination:
(a) transparent base material; and (b) means for representing a circuit pattern on said base material representative of the components of said electronic assembly;

(c) said means comprising a plurality of transparent films;

(d) at least one of said films having a plurality of spaced colored geometric patterns formed thereon, and the remaining of said films being coated with similar geometric patterns, but in a color different from the first recited color; whereupon (e) said one film being employed on said base material to represent one type of said components of said electronic assembly, and said remaining films respectively representing other components of said electronic assembly; and (f) said films being mounted upon said transparent base material so that at areas of overlap of said one film and any other of said remaining films, said first and other colors on said films can be photographically distinguished from each other, whereby upon said master drawing being photographed through successive filters, first said one component represented by said first color can be photographed, and successively said other components respectively represented by said other colors can be photographed, with no substantial loss of any of said colors being sustained at said areas of overlap.

9. A method of optically preparing a plurality of transparencies each of which delineates different aspects of a desired circuit for subsequent use in the development of stencils for the fabrication of thin film substrates, said method comprising the following steps:

(a) attaching at least two configurations of geometric patterns of color upon a transparent base material in at least partially overlapping layers, with any one configuration having patterns of one color and the remaining configurations respectively having patterns of other colors;

(b) relatively positioning said configurations of geometric patterns of color with respect to each other so that any one pattern of color is photographically distinguishable from any other pattern of color of any other configuration at areas in which any one of said configurations overlap any other configuration;

(c) photographically exposing said master drawing through successive color filters whereupon first said one configuration of said one color is obtained, and successively exposing said other configurations of said other colors can be optically processed.

10. A method of photographically producing a plurality of transparencies each of which delineates different components of a desired circuit, said transparencies being adapted for subsequent use in the development of stencils for the fabrication of multilayer thin film circuits, said method comprising the following steps:

(a) attaching a plurality of strips of tape upon a transparent stable base material in at least a partially overlapped arrangement, with the tapes which represent the circuit components which are to be delineated on one transparency having patterns of one color formed thereon, and each of the remaining tapes which respectively represent other circuit components which are to be respectively delineated on other transparencies having patterns of color formed thereon which are different from said one color;

(b) positioning said tapes upon said base material so that the patterns of color on said one tape are photographically distinguishable from the patterns of color on each of said remaining tapes even in the locations of overlap;

(c) directing light emanating from said master drawing through a low resolution reduction lens and toward a light sensitive film;

(d) filtering said directed light before it impinges upon said film by sequentially employing different color filters so that first said one color light rays photographically exposes a first of said films and then said other color light rays photographically expose subsequent films; and (e) photographically processing said exposed films so as to produce said plurality of transparencies.

11. A method of photographically producing a plurality of transparencies in accordance with claim 10 wherein:

(a) said patterns of color formed on said plurality of tapes comprise a plurality of spaced geometric figures so that when said filtered light rays respectively impinge upon said photosensitive films, a solid pattern is formed upon the photosensitive material of said films.

12. A method of photographically producing a plurality of transparencies in accordance with claim 11, wherein:

(a) said geometric figures are substantially circular in shape.

13. A method of photographically producing a plurality of transparencies in accordance with claim 10, wherein:

(a) said patterns of color formed on said plurality of of tapes comprise a plurality of spaced substantially parallel lines so that when said filtered light rays respectively impinge upon said photo-sensitive films, a solid pattern is formed upon the photosensitive material of said films.

References Cited by the Applicant

UNITED STATES PATENTS

| | | | |
|---|---|---|---|
| 2,647,065 | 7/1953 | Scholl | 117—122 |
| 2,699,999 | 1/1955 | Mahler | 117—68.5 |
| 2,818,349 | 12/1957 | Bergstedt et al. | 117—122 |
| 2,889,799 | 6/1959 | Korpman | 117—68.5 |
| 2,942,973 | 6/1960 | Patrick | 96—35 |

OTHER REFERENCES

Kodak Color Handbook, Eastman Kodak Company, 1950, pp. 3–13 and 30–43.

Swiggett: "Introduction to Printed Circuit," 1956, John F. Rider Publisher, Inc. N.Y., pp. 18–38.

NORMAN G. TORCHIN, *Primary Examiner.*

A. D. RICCI, *Assistant Examiner.*